(12) United States Patent
DeBruin et al.

(10) Patent No.: US 7,074,879 B2
(45) Date of Patent: *Jul. 11, 2006

(54) POLYESTER PROCESS USING A PIPE REACTOR

(75) Inventors: Bruce Roger DeBruin, Kingsport, TN (US); Daniel Lee Martin, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 105 days.

This patent is subject to a terminal disclaimer.

(21) Appl. No.: 10/456,448

(22) Filed: Jun. 6, 2003

(65) Prior Publication Data

US 2004/0249112 A1    Dec. 9, 2004

(51) Int. Cl.
  *C08G 63/02*   (2006.01)
  *C08G 85/00*   (2006.01)
  *B22D 11/01*   (2006.01)

(52) U.S. Cl. .................. 528/272; 528/176; 528/300; 528/301; 528/302; 528/307; 528/308; 528/308.6; 526/64; 526/67; 526/71; 525/437; 525/444; 425/6

(58) Field of Classification Search ............. 528/176, 528/272, 300, 301, 302, 307, 308, 308.6; 526/64, 67, 71; 425/6
See application file for complete search history.

(56) References Cited

U.S. PATENT DOCUMENTS

| | | | |
|---|---|---|---|
| 2,361,717 A | 10/1944 | Taylor | |
| 2,709,642 A | 5/1955 | Mann, Jr. et al. | |
| 2,753,249 A | 7/1956 | Idenden et al. | |
| 2,829,153 A | 4/1958 | Vodonik | |
| 2,905,707 A | 9/1959 | Hurt et al. | |
| 2,973,341 A | 2/1961 | Hippe et al. | |
| 3,044,993 A | 7/1962 | Tiemersma | |
| 3,052,711 A | 9/1962 | Glogau et al. | |
| 3,054,776 A | 9/1962 | Higgins | |
| 3,110,547 A | 11/1963 | Emmert | |
| 3,113,843 A | 12/1963 | Li | |
| 3,161,710 A | 12/1964 | Turner | |
| 3,185,668 A | 5/1965 | Meyer et al. | |
| 3,192,184 A | 6/1965 | Brill et al. | |
| 3,241,926 A | 3/1966 | Parker et al. | |
| 3,254,965 A | 6/1966 | Ogle | |
| 3,376,353 A | 4/1968 | Tate | |
| 3,385,881 A | 5/1968 | Bachmann et al. | |
| 3,402,023 A | 9/1968 | Dobo | |
| 3,427,287 A | 2/1969 | Pengilly | |

(Continued)

FOREIGN PATENT DOCUMENTS

BE          780142        3/1972

(Continued)

OTHER PUBLICATIONS

Stahl, Wegmann, Von Rohr; Tubular reactor for liquid reactions with gas release; Catalysis Today 79-80; 2003; pp. 89-95.

(Continued)

*Primary Examiner*—Samuel A. Acquah
(74) *Attorney, Agent, or Firm*—Steven A. Owen; Bernard J. Graves, Jr.

(57) ABSTRACT

There are disclosed polyester processes using a pipe reactor and corresponding apparatuses. In particular, there are disclosed processes and corresponding apparatuses including an esterification pipe reactor with a recirculating reaction zone (RR zone) and a plug reaction profile reaction zone (PRPR zone), especially when operated with a significant part of the overall conversion taking place in the plug reaction profile reaction zone (PRPR zone).

167 Claims, 1 Drawing Sheet

U.S. PATENT DOCUMENTS

| | | | |
|---|---|---|---|
| 3,442,868 A | 5/1969 | Ogata et al. | |
| 3,458,467 A | 7/1969 | Herrie et al. | |
| 3,468,849 A | 9/1969 | Rothert | |
| 3,480,587 A * | 11/1969 | Porter | 526/64 |
| 3,487,049 A | 12/1969 | Busot | |
| 3,496,146 A | 2/1970 | Mellichamp, Jr. | |
| 3,496,220 A | 2/1970 | McCarty et al. | |
| 3,497,743 A | 2/1970 | Kemkes | |
| 3,507,905 A | 4/1970 | Girantet et al. | |
| 3,522,214 A | 7/1970 | Crawford et al. | |
| 3,551,396 A | 12/1970 | Lanthier | |
| 3,582,244 A | 6/1971 | Sinclari et al. | |
| 3,590,070 A | 6/1971 | Martin et al. | |
| 3,590,072 A | 6/1971 | Leybourne, III | |
| 3,595,846 A | 7/1971 | Rouzier | |
| 3,600,137 A | 8/1971 | Girantet et al. | |
| 3,609,125 A | 9/1971 | Fujimoto et al. | |
| 3,639,448 A | 2/1972 | Matsuzawa et al. | |
| 3,644,096 A | 2/1972 | Lewis et al. | |
| 3,644,294 A | 2/1972 | Siclari et al. | |
| 3,644,483 A | 2/1972 | Griehl et al. | |
| 3,646,102 A | 2/1972 | Kobayashi et al. | |
| 3,647,758 A | 3/1972 | Ryffel et al. | |
| 3,651,125 A | 3/1972 | Lewis et al. | |
| 3,684,459 A | 8/1972 | Tate et al. | |
| 3,689,461 A | 9/1972 | Balint et al. | |
| 3,697,579 A | 10/1972 | Balint et al. | |
| 3,723,391 A | 3/1973 | Beer et al. | |
| 3,740,267 A | 6/1973 | Haylock et al. | |
| 3,781,213 A | 12/1973 | Siclari et al. | |
| 3,819,585 A | 6/1974 | Funk et al. | |
| 3,849,379 A | 11/1974 | Jeurissen et al. | |
| 3,867,349 A | 2/1975 | Heeg et al. | |
| 3,892,798 A | 7/1975 | Heeg et al. | |
| 3,927,983 A | 12/1975 | Gordon et al. | |
| 3,960,820 A | 6/1976 | Pinney | |
| 3,988,301 A | 10/1976 | Jeurissen et al. | |
| 4,001,187 A | 1/1977 | Itabashi et al. | |
| 4,008,048 A | 2/1977 | Hellemans et al. | |
| 4,020,049 A | 4/1977 | Rinehart | |
| 4,028,307 A | 6/1977 | Ure | |
| 4,046,718 A | 9/1977 | Mass et al. | |
| 4,049,638 A | 9/1977 | Doerfel et al. | |
| 4,056,514 A | 11/1977 | Strehler et al. | |
| 4,064,112 A | 12/1977 | Rothe et al. | |
| 4,077,945 A | 3/1978 | Heinze et al. | |
| 4,079,046 A | 3/1978 | Brignac et al. | |
| 4,089,888 A | 5/1978 | Tokumitsu et al. | |
| 4,097,468 A | 6/1978 | James et al. | |
| 4,100,142 A | 7/1978 | Schaefer et al. | |
| 4,110,316 A | 8/1978 | Edging et al. | |
| 4,118,582 A | 10/1978 | Walker | |
| 4,122,112 A | 10/1978 | Koda et al. | |
| 4,146,729 A | 3/1979 | Goodley et al. | |
| 4,204,070 A | 5/1980 | Suzuki et al. | |
| 4,212,963 A | 7/1980 | Lehr et al. | |
| 4,223,124 A | 9/1980 | Broughton et al. | |
| 4,230,818 A | 10/1980 | Broughton, Jr. et al. | |
| 4,235,844 A | 11/1980 | Sterzel et al. | |
| 4,238,593 A | 12/1980 | Duh | |
| 4,254,246 A | 3/1981 | Dicoi et al. | |
| 4,289,871 A | 9/1981 | Rowan et al. | |
| 4,289,895 A | 9/1981 | Burkhardt et al. | |
| 4,339,570 A | 7/1982 | Muschelknautz et al. | |
| 4,346,193 A | 8/1982 | Warfel | |
| 4,361,462 A | 11/1982 | Fuji et al. | |
| 4,365,078 A | 12/1982 | Shelley | |
| 4,382,139 A | 5/1983 | Kapteina et al. | |
| 4,383,093 A | 5/1983 | Shiraki et al. | |
| 4,410,750 A | 10/1983 | Langer, Jr. | |
| 4,440,924 A | 4/1984 | Kuze et al. | |
| 4,452,956 A | 6/1984 | Moked et al. | |
| 4,472,558 A | 9/1984 | Casper et al. | |
| 4,499,226 A | 2/1985 | Massey et al. | |
| 4,542,196 A | 9/1985 | Morris et al. | |
| 4,548,788 A | 10/1985 | Morris et al. | |
| 4,550,149 A | 10/1985 | Morris et al. | |
| 4,551,309 A | 11/1985 | Morris et al. | |
| 4,551,510 A | 11/1985 | Morris et al. | |
| 4,554,343 A | 11/1985 | Jackson, Jr. et al. | |
| 4,555,384 A | 11/1985 | Morris et al. | |
| 4,612,363 A | 9/1986 | Sasaki et al. | |
| 4,670,580 A | 6/1987 | Maurer | |
| 4,675,377 A | 6/1987 | Mobley et al. | |
| 4,680,376 A | 7/1987 | Heinze et al. | |
| 4,721,575 A | 1/1988 | Binning et al. | |
| 4,952,627 A | 8/1990 | Morita et al. | |
| 4,973,655 A | 11/1990 | Pipper et al. | |
| 5,041,525 A | 8/1991 | Jackson | |
| 5,064,935 A | 11/1991 | Jackson et al. | |
| 5,162,488 A | 11/1992 | Mason | |
| 5,185,426 A | 2/1993 | Verheijen et al. | |
| 5,194,525 A | 3/1993 | Miura et al. | |
| 5,243,022 A | 9/1993 | Kim et al. | |
| 5,254,288 A | 10/1993 | Verheijen et al. | |
| 5,294,305 A | 3/1994 | Craft, Sr. et al. | |
| 5,300,626 A | 4/1994 | Jehl et al. | |
| 5,340,906 A | 8/1994 | Shirokura et al. | |
| 5,340,907 A | 8/1994 | Yau et al. | |
| 5,384,389 A | 1/1995 | Alewelt et al. | |
| 5,385,773 A | 1/1995 | Yau et al. | |
| 5,413,861 A | 5/1995 | Gallo | |
| 5,464,590 A | 11/1995 | Yount et al. | |
| 5,466,419 A | 11/1995 | Yount et al. | |
| 5,466,765 A | 11/1995 | Haseltine et al. | |
| 5,466,776 A | 11/1995 | Krautstrunk et al. | |
| 5,478,909 A | 12/1995 | Jehl et al. | |
| 5,480,616 A | 1/1996 | Richardson et al. | |
| 5,484,882 A | 1/1996 | Takada et al. | |
| 5,496,469 A | 3/1996 | Scraggs et al. | |
| 5,519,112 A | 5/1996 | Harazoe et al. | |
| 5,573,820 A | 11/1996 | Harazoe et al. | |
| 5,594,077 A | 1/1997 | Groth et al. | |
| 5,602,216 A | 2/1997 | Juvet | |
| 5,648,437 A | 7/1997 | Fischer et al. | |
| 5,650,536 A | 7/1997 | Dankworth et al. | |
| 5,681,918 A | 10/1997 | Adams et al. | |
| 5,688,898 A | 11/1997 | Bhatia | |
| 5,739,219 A | 4/1998 | Fischer et al. | |
| 5,753,190 A | 5/1998 | Haseltine et al. | |
| 5,753,784 A | 5/1998 | Fischer et al. | |
| 5,786,443 A | 7/1998 | Lowe | |
| 5,811,496 A * | 9/1998 | Iwasyk et al. | 525/444 |
| 5,830,981 A | 11/1998 | Koreishi et al. | |
| 5,849,849 A | 12/1998 | Bhatia | |
| 5,898,058 A | 4/1999 | Nichols et al. | |
| 5,902,865 A | 5/1999 | Gausepohl et al. | |
| 5,905,096 A | 5/1999 | Lay et al. | |
| 5,922,828 A | 7/1999 | Schiraldi | |
| 5,932,105 A | 8/1999 | Kelly | |
| 6,069,228 A | 5/2000 | Alsop et al. | |
| 6,096,838 A | 8/2000 | Nakamoto et al. | |
| 6,100,369 A | 8/2000 | Miyajima et al. | |
| 6,103,859 A | 8/2000 | Jernigan et al. | |
| 6,111,035 A | 8/2000 | Sakamoto et al. | |
| 6,111,064 A | 8/2000 | Maurer et al. | |
| 6,113,997 A | 9/2000 | Massey et al. | |
| 6,127,493 A * | 10/2000 | Maurer et al. | 526/64 |
| 6,174,970 B1 | 1/2001 | Braune | |
| 6,252,034 B1 | 6/2001 | Uenishi et al. | |
| 6,339,031 B1 | 1/2002 | Tan | |
| 6,355,738 B1 | 3/2002 | Nakamachi | |
| 6,359,106 B1 | 3/2002 | Nakamoto | |
| 6,399,031 B1 | 6/2002 | Herrmann et al. | |

| | | | |
|---|---|---|---|
| 6,551,517 B1 | 4/2003 | Sentagnes et al. | |
| 6,623,643 B1 | 9/2003 | Chisholm et al. | |
| 6,916,939 B1 | 7/2005 | Yamane et al. | |
| 2002/0086969 A1 | 7/2002 | DeBruin | |
| 2002/0091227 A1 | 7/2002 | DeBruin | |
| 2002/0128399 A1 | 9/2002 | Nakamoto et al. | |
| 2002/0137877 A1 | 9/2002 | Debruin | |
| 2002/0180099 A1 | 12/2002 | Keillor, III | |
| 2003/0037910 A1 | 2/2003 | Smymov | |
| 2003/0133856 A1 | 7/2003 | Le | |
| 2003/0191326 A1 | 10/2003 | Yamane et al. | |

FOREIGN PATENT DOCUMENTS

| | | |
|---|---|---|
| BR | 7906279 | 7/1981 |
| DE | 2200832 | 7/1973 |
| DE | 125 798 | 5/1977 |
| DE | 126 073 | 6/1977 |
| DE | 146 298 B | 2/1981 |
| DE | 206 558 | 2/1984 |
| DE | 229 415 A1 | 11/1985 |
| DE | 4235785 A1 | 5/1994 |
| DE | 195 37 930 A1 | 4/1997 |
| EP | 0070707 A1 | 1/1983 |
| EP | 0850962 A2 | 7/1998 |
| EP | 0 999 228 A2 | 5/2000 |
| EP | 1065193 A1 | 1/2001 |
| FR | 2168990 | 9/1973 |
| FR | 2302778 | 10/1976 |
| GB | 1013.34 | 12/1965 |
| GB | 1154538 | 6/1969 |
| GB | 2010294 A | 6/1979 |
| GB | 0 052 535 A | 1/1981 |
| GB | 2052535 A | 1/1981 |
| JP | 424993 B | 3/1967 |
| JP | 4218353 B | 9/1967 |
| JP | 4739043 A | 12/1972 |
| JP | 48 94795 A | 12/1973 |
| JP | 49 28698 A | 3/1974 |
| JP | 49 34593 A | 3/1974 |
| JP | 49 105893 A | 10/1974 |
| JP | 50 82197 A | 7/1975 |
| JP | 51 29460 A | 3/1976 |
| JP | 51 100036 A | 9/1976 |
| JP | 51 136788 A | 11/1976 |
| JP | 51 136789 A | 11/1976 |
| JP | 52 51495 A | 4/1977 |
| JP | 52 71432 A | 6/1977 |
| JP | 52 78845 A | 7/1977 |
| JP | 52 83424 A | 7/1977 |
| JP | 52 87133 A | 7/1977 |
| JP | 53 31793 A | 3/1978 |
| JP | 53 34894 A | 3/1978 |
| JP | 54 41833 A | 4/1979 |
| JP | 54 76535 A | 6/1979 |
| JP | 54 79242 A | 6/1979 |
| JP | 54 100494 A | 8/1979 |
| JP | 54 157536 A | 12/1979 |
| JP | 55 43128 A | 3/1980 |
| JP | 55 108422 A | 8/1980 |
| JP | 55135133 A | 10/1980 |
| JP | 58 129020 A | 8/1983 |
| JP | 59 47226 A | 3/1984 |
| JP | 59 53530 A | 3/1984 |
| JP | 59 68326 A | 4/1984 |
| JP | 59 71326 A | 4/1984 |
| JP | 60 15421 A | 1/1985 |
| JP | 60 72845 A | 4/1985 |
| JP | 60 115551 A | 6/1985 |
| JP | 60 120839 A | 6/1985 |
| JP | 60 163918 A | 8/1985 |
| JP | 60 226846 A | 11/1985 |
| JP | 62 207325 A | 9/1987 |
| JP | 62292831 | 12/1987 |
| JP | 64 56726 A | 3/1989 |
| JP | 1 102044 A | 4/1989 |
| JP | 3 192118 A | 8/1991 |
| JP | 3 292323 A | 12/1991 |
| JP | 5-78402 | 3/1993 |
| JP | 5 155994 A | 6/1993 |
| JP | 6 247899 A | 9/1994 |
| JP | 7 118208 A | 5/1995 |
| JP | 7 173268 A | 7/1995 |
| JP | 7 238151 A | 9/1995 |
| JP | 8 198960 A | 8/1996 |
| JP | 8 283398 A | 10/1996 |
| JP | 10 36495 A | 2/1998 |
| JP | 1998259244 A | 9/1998 |
| JP | 11 106489 A | 4/1999 |
| JP | 1999092555 A | 4/1999 |
| JP | 11 217429 A | 8/1999 |
| JP | 2000095851 A | 4/2000 |
| KR | 1993-0005144 B1 | 6/1993 |
| KR | 1994-0011540 B1 | 3/1994 |
| NL | 1001787 | 8/1965 |
| NL | 6704303 | 9/1967 |
| PL | 136188 | 8/1987 |
| SU | 973552 | 11/1982 |
| WO | WO 96/22318 | 7/1996 |
| WO | WO 98/08602 | 3/1998 |
| WO | WO 98/10007 | 3/1998 |
| WO | WO 99/16537 | 4/1999 |
| WO | WO 02/26841 A1 | 4/2002 |
| WO | WO 02/096975 A1 | 12/2002 |
| WO | WO 03/006526 A1 | 1/2003 |

OTHER PUBLICATIONS

Perry's Chemical Engineers' Handbook, 7$^{th}$ Edition, pp. 14-82 to 14-95.

PCT International Search Report from U.S. Appl. No. 10/013,318, filed Dec. 7, 2001.

Perry, Robert H. and Green, Don, "*Flow in Pipes and Channels*", Perry's Chemical Engineer's Handbook, (1984), pp. 5-23, 6$^{th}$ Edition, McGraw-Hill, United States.

Perry, Robert H. and Green, Don, "*Fluid and Particle Mechanics*", Perry's Chemical Engineer's Handbook, (1984), 5-40 to 5-41, 6$^{th}$ Edition, McGraw-Hill, United States.

Nauman, E. B., "*Enhancement of Heat Transfer and Thermal Homogenity with Motionless Mixers*", American Institute of Chemical Engineer's Journal, (1979), pp. 246-258, vol. 25, No. 2.

Brodkey, Robert S., "*Multiphase Phenomena I: Pipe Flow*", The Phenomena of Fluid Motions, (1967), pp. 456-538, Addison-Wesley Publishing Company, United States.

Gupta, S.K. and Kumar, Anil, "*Polyester Reactors*", Plenum Chemical Engineering Series, (1987), pp. 241-318, Chapter 8, Plenum Press, New York.

Office Action dated Jun. 27, 2005, for U.S. Appl. No. 10/456,309.

Office Action dated Oct. 24, 2005 for U.S. Appl. No. 10/456,309.

Office Action for U.S. Appl. No. 10/456,309 dated Dec. 15, 2004.

\* cited by examiner

POLYESTER PROCESS USING A PIPE REACTOR

FIELD OF THE INVENTION

The invention relates to polyester processes using a pipe reactor and to corresponding apparatuses. More particularly, the invention relates to processes and to corresponding apparatuses including an esterification pipe reactor with a recirculating reaction zone (RR zone) and a plug reaction profile reaction zone (PRPR zone), especially when operated with a significant part of the overall conversion taking place in the plug reaction profile reaction zone (PRPR zone).

BACKGROUND OF THE INVENTION

As the business of manufacturing polyesters becomes more competitive, alternative processes have become highly desirable. Relevant background for this invention is given in a U.S. patent application related to the present one and filed the same day entitled "Polyester Process Using a Pipe Reactor" with the inventor, Bruce Roger DeBruin; this latter application is hereby incorporated by reference to the extent that it does not contradict the disclosures in the present application.

Another related U.S. patent application filed the same day as the present one and entitled, "Polyester Process Using a Pipe Reactor", with the inventors, Richard Gill Bonner and Bruce Roger Debruin is also hereby incorporated by reference to the extent that it does not contradict the disclosures in the present application.

In addition are the related cases U.S. application Ser. No. 10/013,318 filed Dec. 7, 2001, and U.S. Provisional Application Ser. No. 60/254,040 filed Dec. 7, 2000, both hereby incorporated by reference to the extent that they do not contradict statements herein.

SUMMARY OF THE INVENTION

It is an object of this invention to provide polyester processes using a pipe reactor. Thus, this invention relates to a process for making a pre-polyester comprising: providing an esterification pipe reactor comprising a pipe, the pipe having an inlet and an outlet; adding a solubilizing agent into the pipe; and reacting one or more reactants flowing in the pipe towards the outlet under esterification reaction conditions to form the pre-polyester.

The invention also relates to similar processes wherein the pipe also has a recirculation reaction zone (RR zone) and a plug reaction profile reaction zone (PRPR zone) with the RR zone being closer to the inlet than the PRPR zone is.

Further, the invention relates to any of these processes wherein the average solids content of the material flowing through the outlet of the RR zone of the pipe is less than 2.5 weight percent and operating conditions in the pipe are such that conversion at the outlet of the PRPR zone is greater than or equal to 1.08 times the conversion at the outlet of the RR zone.

Similarly, the invention relates to a process for making a polyester oligomer, a polyester or both comprising: performing any of the aforementioned processes for making a pre-polyester; and reacting the pre-polyester and optionally other reactants, under polycondensation reaction conditions, to form the polyester oligomer, the polyester or both.

A further object of this invention is to provide apparatuses for polyester processes using a pipe reactor. Thus, the invention relates to apparatuses corresponding to the processes described here.

BRIEF DESCRIPTION OF THE DRAWINGS

The accompanying drawings, which are incorporated in and constitute a part of this specification, illustrate several embodiments of the invention and together with the description serve to explain the principles of the invention.

Figure 1:
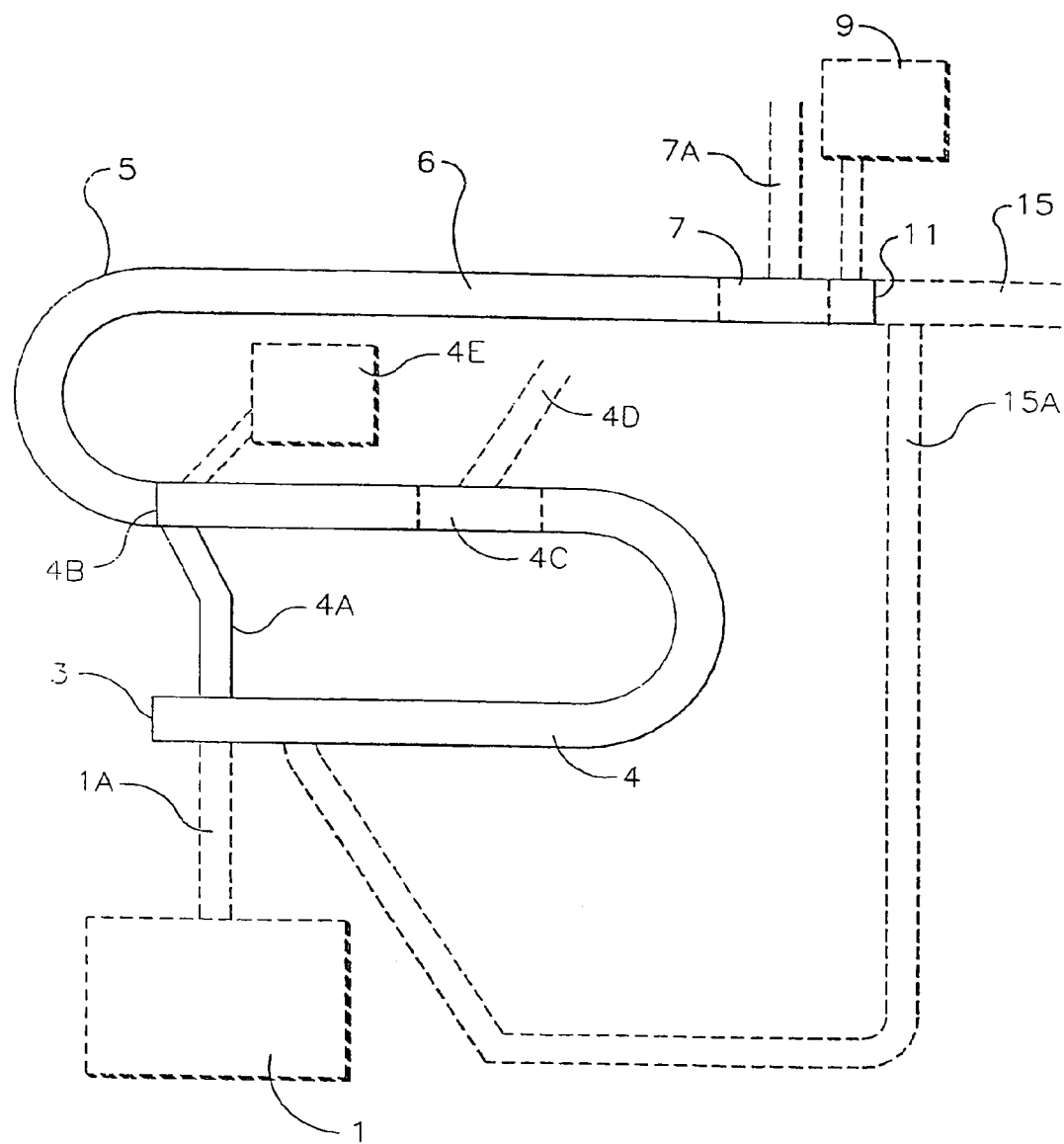
FIG. 1 shows typical embodiments of the polyester processes and apparatuses of the present invention.

Key to Number Designations in FIG. 1

| | |
|---|---|
| 1 | tank (optional) |
| 1A | line from tank to pipe (optional) |
| 3 | pipe inlet |
| 4 | RR zone |
| 4A | RR zone recycle line |
| 4B | RR zone outlet |
| 4C | vapor disengager (optional) |
| 4D | vapor line (optional) |
| 4E | solids detector (optional) |
| 5 | pipe of esterification pipe reactor |
| 6 | PRPR zone |
| 7 | vapor disengager (optional) |
| 7A | vapor line (optional) |
| 9 | solids detector (optional) |
| 11 | pipe outlet |
| 15 | polycondensation reactor (optional and shown as a pipe reactor) |
| 15A | line from polycondensation reactor to pipe (optional) |

DETAILED DESCRIPTION OF THE INVENTION

In this disclosure and the claims that follow, unless otherwise indicated, the term polyester is used in a broad sense and refers to a polymer containing more than 100 ester linkages (or more than 100 corresponding linkages in the case of derivatives of "straight" or "pure" polyesters such as polyetheresters, polyester amides and polyetherester amides). Similarly, polyester monomers would have 1 to 2 such linkages, polyester dimers 3 to 4 such linkages, polyester trimers 5 to 6 such linkages and polyester oligomers 7 to 100 such linkages. Pre-polyester refers to polyester monomers, dimers, trimers, oligomers and combinations of these.

For simplicity, polyester processes will be understood to include processes for making pre-polyesters when used in this disclosure and the claims that follow, unless indicated otherwise.

The processes according to the present invention include a process for making a pre-polyester comprising: providing an esterification pipe reactor comprising a pipe, the pipe having an inlet and an outlet; adding a solubilizing agent into the pipe; and reacting one or more reactants flowing in the pipe towards the outlet under esterification reaction conditions to form the pre-polyester.

In the reaction systems covered by the processes of the present invention, there may be solubility problems involving one or more reactants. For example, terephthalic acid is not very soluble in ethylene glycol, thus making it difficult to get the two to react in making polyethylene terephthalate. Thus, the processes of the present invention include adding a solubilizing agent into the pipe. For purposes here, a solubilizing agent makes one or more reactants more soluble in the other(s) or the reaction mixture generally; in this context (in reference to solubilizing a gents), reactants will be taken as only those that are precursors for polyester monomers (as solubilizing agents are not such precursors). Suitable solubilizing agents include those comprising a polyester monomer, dimer and/or trimer; those comprising a polyester oligomer; those comprising a polyester; those comprising organic solvents such as chlorinated aromatics (like trichlorobenzenes), mixtures of phenol and chlorinated hydrocarbons (like tetrachloroethane) tetrahydrofuran or dimethyl sulfoxide; as well as those comprising combinations of these. Such agents comprising a polyester oligomer, especially of the type being produced in the process, are often preferred. These agents may be mixed with reactants prior to addition to the pipe or added to the pipe separately in whole or in part. If mixed with reactants (here polyester monomer precursors) in any way, the solubilizing agent would be considered to be the mixture less any such reactants.

For simplicity, esterification is taken to include, throughout this disclosure and the claims that follow, not only its common meaning, but ester exchange as well.

More specifically, the pipe may also have a recirculation reaction zone (RR zone) and a plug reaction profile reaction zone (PRPR zone) with the RR zone being closer to the inlet than the PRPR zone is. The pipe may be substantially empty; that is, substantially free of mechanical or structural internals (reactants and the like not included of course). The pipe is understood to be hollow in the context of this disclosure and the claims that follow.

In this disclosure and the claims that follow, RR zone refers to a zone in a pipe reactor wherein the product of reaction (in whole or in part) of the zone is recirculated (recycled) from the outlet to the inlet of the zone; for purposes here, the zone and its inlet and outlet are defined by the presence and location of such recirculation. Physical changes (including filtering, cooling and heating), removal of vapor, residual reaction, addition of polyester monomer forming reactants and addition of modifiers (such as toners, catalysts and stabilizers) involving the recycled material after leaving the outlet and prior to arrival at the inlet are acceptable.

In contrast, in this disclosure and the claims that follow, PRPR zone refers to a zone in a pipe reactor wherein no portion of the reaction product of any part of the zone is recirculated back to the zone, but the product is instead isolated and/or sent on to other process equipment. It is possible that PRPR zone reaction product that has been compositionally changed could be fed back into the PRPR, however, but the change would have to be such to allow for a reaction profile that is at least substantially plug type. This reaction profile is the hallmark of a PRPR zone; generally, no special requirements other than those given here are required to generate the profile.

The processes according to the present invention also include processes for making a polyester oligomer, a polyester or both comprising performing (the steps of) any of the processes for making a pre-polyester previously described and reacting the pre-polyester and optionally other reactants, under polycondensation reaction conditions, to form the polyester oligomer, the polyester or both. This last mentioned step of reacting under polycondensation reaction conditions may be carried out in a polycondensation pipe reactor or other type of reactor for polycondensation.

Going back to the solubilizing agents previously discussed, these agents can be thought to at least reduce the likelihood of plugging by the compositions to which they are employed. It has been found that a preferred range for the ratio of the mass flow rate of solubilizing agent added to the pipe to the mass flow of the material leaving the pipe and not being recycled back to the pipe is from 2:1 to 25:1; another such range is 3:1 to 20:1. Not recycled back in this context means not directly recycled back; that is not recycled back unless significantly compositionally changed.

Similarly, it has been found that a preferred range for the ratio of the mass flow rate of solubilizing agent added to the RR zone to the mass flow of the material leaving the RR zone and not being recycled back to the RR zone is from 2:1 to 25:1 (with another such range being 3:1 to 20:1). The phrase, not recycled back, is as before, not directly recycled back; that is not recycled back unless significantly compositionally changed. Added refers to that which has not entered from the previous zone in the pipe or pipe inlet if the zone is first.

Depending on the solubilizing agent, some heating or cooling may be required; these agents being related to solubility as opposed to freezing and boiling point changes of what they are added to.

Many different types of reactants or mixtures of reactants may be used in forming polyesters and pre-polyesters according to the processes of the present invention, the types or mixtures of reactants comprising a dicarboxylic acid (abbreviated here as a diacid), a diol, a diester, a hydroxy ester, a carboxylic acid ester (abbreviated here as an acid ester), a hydroxy carboxylic acid (abbreviated here as a hydroxy acid) or combinations thereof. It is possible that related materials such as tricarboxylic acids and other such multifunctional materials could also be employed. It should be understood that acid in this context would include corresponding mono, di or higher order salts. Of course, the pre-polyesters and polyesters being formed may be in turn reactants themselves.

More specific reactants or mixtures of reactants of interest comprise aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Such comprise terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2,-dimethyl-1,3-propandiol, dicarboxylic acid, succinic acid, glutaric acid, adipic acid, azelaic acid, sebacic acid, mixtures thereof, and the like. The acid component can be fulfilled by the ester thereof, such as with dimethyl terephthalate.

Further more specific reactants or mixtures of reactants comprise cycloaliphatic diols preferably having 6 to 20 carbon atoms or aliphatic diols preferably having 3 to 20 carbon atoms. Such comprise ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2, 4), 2-methylpentanediol-(1,4), 2,2,4-trimethylpentane-diol-(1,3), 2-ethylhexanediol-(1,3), 2,2-diethylpropane-diol-(1, 3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4,1-phenyleneoxy))bis(ethanol), mixtures thereof, and the like. Pre-polyesters and polyesters may be prepared from one or more of the above type diols.

Some preferred comonomers comprise terephthalic acid, dimethyl terephthalate, isophthalic acid, dimethyl isophthalate, dimethyl-2,6-naphthalenedicarboxylate, 2,6-naphthalenedicarboxylic acid, ethylene glycol, diethylene glycol, 1,4-cyclohexane-dimethanol (CHDM), 1,4-butanediol, polytetramethyleneglyocl, trans-DMCD (trans-dimethyl 1,4-cyclohexane dicarboxylate), trimellitic anhydride, dimethyl cyclohexane-1,4-dicarboxylate, dimethyl decalin-2,6 dicarboxylate, decalin dimethanol, decahydronaphthalane 2,6-dicarboxylate, 2,6-dihydroxymethyl-decahydronaphthalene, hydroquinone, hydroxybenzoic acid, mixtures thereof, and the like. Bifunctional (A—B type where the ends are not the same) comonomers, such as hydroxybenzoic acid may also be included.

Some specific reactants or mixtures of reactants of very special interest comprise terephthalic acid (TPA; understood to include crude, purified (PTA) or that in between), dimethyl terephthalate (DMT), cyclohexane dimethanol (CHDM), isophthalic acid (IPA), ethylene glycol (EG) or combinations thereof.

Many types of polyesters may be made using the processes of the present invention. Two of special interest are polyethylene terephthalate (PET) and PETG (PET modified with CHDM).

Ranges stated in this disclosure and the claims that follow should be understood to disclose the entire range specifically and not just endpoints(s). For example, disclosure of the range 0 to 10 should be taken to specifically disclose 2, 2.5, and 3.17 and all other numbers subsumed in the range and not just 0 and 10. Further a disclosure of C1 to C5 (one to five carbon) hydrocarbons would be a specific disclosure of not only C1 and C5 hydrocarbons, but also of C2, C3, and C4 hydrocarbons; ranges that are clearly meant to be ranges of integers should be understood correspondingly.

Solubility problems, especially relating to polyester monomer forming reactants as previously mentioned, may occur. This can be troublesome for reasons other than decreases in conversion. If the solids content of a process stream is high enough, damage can occur in many common types of pumps as well as other process equipment. For purposes here, solids should be understood as referring to particles larger than 1 μm (micron) in diameter at their widest point. Thus, it is one preferred operating zone in the processes of the present invention where the average solids content of the material flowing through the outlet of the pipe is less than 2.5 weight percent; another such zone is where the average solids content of the material flowing through the outlet of the pipe is less than 0.5 weight percent. Of course, no solids might be ideal in many instances. These solids limits may also be applied in reference to the outlet of the RR zone of the pipe.

Surprisingly, it has been found that unlike most conventional esterification systems, such as multiple continuously stirred tank type reactors in series, where the series reactors are of about the same efficiency, an esterification system with an RR zone combined with a later PRPR zone according to the present invention does not usually have close to the same efficiency throughout. Specifically, the PRPR zone is usually significantly more efficient than the RR zone. In this context, efficiency is percent increased conversion per unit reactor volume. Thus, it is advantageous in such situations to push toward maximizing conversion in the PRPR zone. The processes according to the present invention therefore include those previously described wherein the conversion in the product of the RR zone of the pipe is 75 to 95 percent or 80 to 95 percent or 80 to 90 percent. In this disclosure and the claims that follow, conversion refers to the percentage of reactive end groups in the liquid phase as measured at the location specified that are esterified.

Similarly, the processes of the present invention include those previously described wherein the solids content of material leaving the outlet of the RR zone is 2.5 weight percent or less (or 0.5 weight percent or less, with no solids often ideal) and operating conditions in the pipe are such that conversion at the outlet of the PRPR zone is greater than or equal to 1.08 (or 1.10 or 1.15) times the conversion at the outlet of the RR zone. The solids content is included here as it is often a constraint of sorts in actual systems.

The reactions taking place as part of the processes according to the present invention ordinarily produce water (and perhaps other types of) vapor, which unless removed, may significantly reduce product yield. Thus, the processes of the present invention may further comprise removing vapor from inside the pipe and/or from the inside of the RR zone of the pipe.

It is often advantageous for certain flow regimes to be present in the zones of the esterification pipe reactors of the present invention. Thus, the processes of the present invention include those previously described wherein at least one of the RR and PRPR zones has froth or stratified flow appearing. For this purpose, stratified flow may be defined as a flow pattern in a pipe in which liquid flows along the bottom and vapor flows over a liquid-vapor interface, while froth flow may be defined as a flow pattern in a pipe in which bubbles of vapor are widely dispersed in the liquid.

The processes of the present invention include those wherein the solubilizing agent is added at least in part from a tank, is at least in part from the outlet of an RR zone, and/or is at least in part a product of a polyester polycondensation reactor.

The apparatuses of the present invention include those corresponding to the processes of the present invention. In particular, an apparatus for making a pre-polyester comprising: an esterification pipe reactor comprising a pipe, the pipe having an inlet, an outlet and means for addition of a solubilizing agent, and wherein pre-polyester forming reactants are passed towards the outlet.

Means for addition of the solubilizing agent include connection to a tank, an RR zone (especially at or near the outlet of the RR zone) and/or connection to a polyester polycondensation reactor.

More specifically, the pipe may also have a recirculation reaction zone (RR zone) and a plug reaction profile reaction zone (PRPR zone) with the RR zone being closer to the inlet than the PRPR zone is. The pipe may be substantially empty (as previously defined).

The apparatuses of the present invention also include those for making a polyester oligomer, a polyester or both comprising any of the apparatuses previously described and a polycondensation reactor connected to the outlet of the pipe. This last mentioned polycondensation reactor may be a polycondensation pipe reactor or of any type suitable for polycondensation.

In reference to the apparatuses of the present invention connected means directly or indirectly (through bridging piece(s) of process equipment) in fluid communication.

As discussed previously, it is often important to remove vapor from inside the pipe, so the apparatuses of the present invention may further comprise means for removing vapor from inside the pipe at at least one point along the pipe. This point along the pipe could include the inlet or the outlet and may specifically be along an RR zone of the pipe, including its inlet and outlet. In addition or instead of removal from the pipe, vapor could be removed outside of the pipe, generally and/or prior to polycondensation and/or during polycondensation. Means for such vapor removal include vapor disengagers, vents and other devices known in the art. See Perry's Chemical Engineers' Handbook, 7th ed., pp. 14–82 to 14–95, hereby incorporated by reference for this purpose.

One variation on the apparatuses of the present invention possible is the addition of a tank for holding solubilizing agent (which may be mixed with reactants (polyester monomer precursors here) if desired) that is connected to the pipe at a point other than the outlet (which could be at a point in the RR zone or its inlet or outlet). Further, a recycle line connecting the pipe at a point (which could be at a point in the RR zone or its inlet or outlet) nearer to the outlet than the inlet with the pipe at a point (which could be at a point in the RR zone or its inlet or outlet) nearer the inlet than the outlet could be employed at least for addition of recycle as a solubilizing agent to the pipe. Similarly, a flow line from the polycondensation reactor to the pipe at a point (which could be at a point in the RR zone or its inlet or outlet) other than the outlet could also be added. These all represent means for addition of solubilizing agent.

The apparatuses according to the present invention may further comprise a solids detector connected to the pipe, especially at outlet of the pipe or outlet of the RR zone. Connected in this context means attached such that solids may be detected inside the pipe or RR zone at the point of connection. Depending on the device chosen, the connection could be direct or indirect as to fluid communication. For this purpose, solids are particles larger than 1 μm (micron) in diameter at their widest point. Specific solids detectors useful here include those based on light scattering, and high energy radiation scattering, as well as the coriolis density meter.

FIG. 1 illustrates the apparatuses of the present invention as well as the corresponding processes. Optional tank 1 is for storage of solubilizing agent which may be mixed with fresh reactants. It is connected by 1A (if present) to the pipe of the esterification pipe reactor 5. Pipe inlet 3 is where fresh reactants are ordinarily charged to the reactor and is a reference point for flow through the pipe 5. Pipe 5 is shown in a one possible orientation with several horizontal sections bridged by upward bends and the inlet 3 is below the pipe outlet 11 in elevation. During operation, reactants flow through the pipe 5 forming pre-polyester. The pipe 5 is shown here having an RR zone 4 and a PRPR zone 6; although this is not required, it is a preferred embodiment of this invention. The RR zone recycle line is shown at 4A. An optional vapor disengager in the RR zone is shown at 4C along with its associated line 4D; as explained previously, vapor build up may negatively affect product yield in the reactor system. An optional solids detector for measuring solids in the outlet of the RR zone 4 is shown at 4E at the outlet of the RR zone 4B (as demarked by the recycle line 4A which allows for RR zone output to be recycled back as shown). Shown near the pipe outlet 11 is an optional vapor disengager 7 and vapor line 7A for discharge of vapor from the flow in the pipe. Flow through the pipe 5 leaves at the pipe outlet 11. An optional solids detector 9 is shown at the pipe outlet 11 for determination of solids content in the material flowing through the outlet 11. Flow from the pipe outlet 11 optionally enters the polycondensation reactor 15 (if present) which may be a polycondensation pipe reactor as shown. Optionally, some flow from the polycondensation reactor 15 may be sent back to the pipe 5 through the line 15A as shown. Flows through 4A and 15A may act as solubilizing agents as discussed above.

EXAMPLES

The invention can be further illustrated by the following examples, but it should be understood that these examples are included merely for purposes of illustration and are not intended to limit the scope of the invention unless otherwise specifically indicated. Titles in the examples are given for convenience and should not be taken as limiting.

Example 1

Using ASPEN modeling, exemplary volumes and pipe diameters were calculated for a commercial scale pipe reactor system for esterification of purified terephthalic acid (PTA) in ethylene glycol (EG). ASPEN Plus version 11.1 with Polymers Plus and ASPEN's PET Technology was used. The esterification reactor is modeled as a series of 5 CSTR reactor models followed by a plug flow reactor model. The results of the modeling and a pipe sizing for a series of stratified flow pipe reactors for esterification using polyester monomer recirculated from the exit of the first pipe reactor to the entrance of the first pipe reactor as a solubilizing agent for the feed PTA are shown in Table 1. This example shows the optimization effects of using recirculation only as required for solubility concerns and using plug reaction profile with no recirculation as much as possible.

TABLE 1

| Example: | Calculations for single recirculating pipe reactor with two vapor takeoffs followed by plug flow pipe optimized for total volume |
|---|---|
| PTA feed rate (lb/hr): | 31320 |
| Recirculation ratio (lbs of recirc/lb of product): | 4.0 |
| feed mole ratio (mole EG/mole PTA): | 1.6 |
| % conversion of acid end groups: | 96% |
| Temperature (° C.): | 285 |
| maximum pressure (psig): | 52.1 |
| recirculating reactor liquid volume (cu. ft): | 318 |
| plug flow reactor liquid volume (cu. ft): | 353 |
| number of parallel pipes in recirculating reactor: | 8 |
| recirculating reactor diameter (in): | 16 |
| recirculating reactor maximum liquid superficial velocity (ft/s): | 0.07 |
| recirculating reactor maximum vapor superficial velocity (ft/s): | 5.5 |
| number of parallel pipes in plug flow reactor: | 6 |
| plug flow reactor diameter (in): | 12 |
| plug flow reactor maximum liquid superficial velocity (ft/s): | 0.03 |
| plug flow reactor maximum vapor superficial velocity (ft/s): | 1.8 |

Example 2 Lab-Model Comparison

Lab Scale Reactor

A lab scale esterification pipe reactor was built to demonstrate such esterification of PTA and EG in a laboratory setting. The lab unit consisted of a pipe reactor made of 664.75 inches of 0.5" 18 BWG stainless tubing heated by electric tracing, a 1200 ml receiver with agitator for receiving the output of the pipe reactor and acting as a disengagement zone to allow the removal of vapors, a recirculating monomer gear pump which pumps liquid oligomer from the receiver back into the inlet of the pipe reactor, and a PTA/EG paste feed system which feed raw materials into the recirculating loop.

The reactor was started by charging a PTA based CHDM modified (2.5 weight percent) oligomer of approximately 96% conversion into the receiver (C01) and filling the pipe reactor with this oligomer in recirculating mode. After recirculating the oligomer at temperature, a PTA/EG paste feed was introduced into the recirculating flow. After the reactor reached steady state, samples were taken from the C-01 receiver at a rate equal to the product generation rate.

These samples were analyzed for percent conversion by proton NMR analysis to determine the extent of reaction that took place in the pipe reactor. % Conversion based on Esters was determined by Proton NMR using a Trifluoroacetic Anhydride Method.

Ten mg of the sample to be analyzed is dissolved in 1 ml of a solvent mixture of chloroform-d with 0.05% Tetramethylsilane (TMS)/trifluoroacetic acid-d/trifluoroacetic anhydride in a 72/22/8 volume ratio. The mixture is heated to 50° C. and stirred as needed to completely dissolve the sample to be analyzed.

The appropriate amount of the sample solution is transferred into a 5 mm NMR tube and the tube is capped. The proton NMR signal is recorded using an average of 64 signals collections. The NMR signal using a 600 MHz NMR and a NMR pulse sequence is collected which gives quantitative proton NMR signals and also decouples the carbon 13 NMR frequencies. The NMR spectrum is analyzed by measuring the correct areas and calculating the % conversion of acid groups to ester groups by the areas and calculations below:

Areas between the following chemical shift points referenced to TMS are measured, and % conversion calculated using the formula.
Area A=7.92 ppm to 8.47 ppm
Area B=5.01 ppm to a valley between 4.82 and 4.77 ppm
Area C=4.82 ppm to a valley between 4.74 and 4.69 ppm
Area D=A valley between 4.28 ppm and 4.18 ppm to a valley between 4.10 and 4.16 ppm
Area E=A valley between 4.10 ppm and 4.16 ppm to a valley between 4.0 and 4.08 ppm
Area F=8.6 ppm to 8.9 ppm
Area G=7.55 ppm to 7.8 ppm
% Conversion=100*(B+(0.5*C)+D+(0.5*E))/(A+F+G)

The samples were also analyzed by gas chromatograph for percent DEG by mass to determine the rate of the side reaction. The effect of residence time and recirculation ratio was seen by varying the feed rate of the paste.

Results from laboratory runs can be seen in Table 2 below.

Model Comparison

An ASPEN model was used to simulate the lab apparatus previously described in this example. In this case, ASPEN 11.1 with Polymers Plus, and ASPEN's PET Technology was used for the modeling with a model configuration similar to the one described for Example 1. Neither model configuration nor software were significantly different from that used in Example 1. In order to correctly simulate the dissolution of PTA into the oligomer at different conditions in the lab, it was sometimes necessary to add dissolution kinetics to the model. Table 3 shows three comparisons of lab runs with the model without dissolution kinetics included; this model was found to be of reasonable accuracy when the experimental conditions resulted in completely dissolved PTA as in these runs. Table 3 also shows two examples of comparisons of lab runs with the model including the dissolution kinetics; this model including the dissolution kinetics closely matches the measured conversion when free PTA is present at the end of the lab scale pipe reactor as in these runs. Conversion is defined in this context as the percentage of reactive (acid if use PTA as here) end groups in the liquid phase that are esterified as measured at the outlet of reactor.

TABLE 2

| Experiment | Temp (° C.) | Pressure (psig) | Recirc Rate (lbs/hr) | Paste Feed Rate (lbs/hr) | Feed Mole Ratio (EG/PTA) | Measured % Conversion | Measured weight % DEG |
|---|---|---|---|---|---|---|---|
| 1 | 285 | 0 | 67 | 1 | 1.8 | 94.2% | 1.1% |
| 2 | 285 | 0 | 67 | 1 | 1.8 | 93.7% | 1.1% |
| 3 | 285 | 0 | 67 | 1 | 1.8 | 92.5% | 1.4% |
| 4 | 285 | 0 | 67 | 1.5 | 1.8 | 92.7% | 1.0% |
| 5 | 285 | 0 | 67 | 2 | 1.8 | 90.9% | 0.6% |
| 6 | 285 | 0 | 67 | 2.5 | 1.8 | 87.2% | 0.7% |
| 7 | 285 | 0 | 67 | 3 | 1.8 | 64.2% | 0.2% |
| 8 | 285 | 0 | 67 | 3.5 | 1.8 | 67.1% | 0.6% |
| 9 | 285 | 0 | 67 | 4 | 1.8 | 51.9% | 0.3% |
| 10 | 285 | 0 | 67 | 3.5 | 1.8 | 77.4% | 0.3% |

TABLE 3

| Paste feed (g/min) | Monomer Circulation (g/min) | Temp. ° C. | Paste Mole Ratio (EG/PTA) | Unreacted PTA, Weight % | Model Predicted % Conversion | Measured % Conversion |
|---|---|---|---|---|---|---|
| Completely Dissolved PTA - No Dissolution Kinetics in Model ||||||||
| 8 | 507 | 263.2 | 1.8 | 0.00 | 97.053 | 95.170 |
| 8 | 507 | 253.9 | 1.8 | 0.00 | 96.645 | 93.750 |
| 15 | 507 | 265.5 | 1.8 | 0.00 | 96.269 | 91.630 |
| PTA Not Completely Dissolved/Dissolution Kinetics in Model ||||||||
| 19 | 507 | 261.5 | 1.8 | 2.93 | 90.935 | 86.500 |
| 15 | 507 | 261.5 | 1.8 | 3.34 | 90.228 | 85.490 |

What is claimed is:

1. A process for making a pre-polyester comprising:
providing an esterification pipe reactor comprising a pipe, the pipe having an inlet and an outlet;
adding a solubilizing agent into the pipe; and
reacting one or more reactants flowing in the pipe towards the outlet under esterification reaction conditions to form the pre-polyester,
with the pipe also having a recirculation reaction zone (RR zone) and a plug reaction profile reaction zone (PRPR zone) with the RR zone being closer to the inlet than the PRPR zone is.

2. The process of claim 1 wherein the pipe is substantially empty.

3. A process comprising:
performing the process according to claim 1 to make a pre-polyester; and
reacting the pre-polyester and optionally other reactants, under polycondensation reaction conditions.

4. The process of claim 3 wherein the step of reacting under polycondensation reaction conditions is carried out in a polycondensation pipe reactor.

5. A process comprising:
performing the process according to claim 2 to make a pre-polyester; and
reacting the pre-polyester and optionally other reactants, under polycondensation reaction conditions.

6. The process of claim 5 wherein the step of reacting under polycondensation reaction conditions is carried out in a polycondensation pipe reactor.

7. The process of claim 1 wherein the solubilizing agent comprises a polyester oligomer.

8. The process of claim 2 wherein the solubilizing agent comprises a polyester oligomer.

9. A process comprising:
performing the process according to claim 7 to make a pre-polyester; and
reacting the pre-polyester and optionally other reactants, under polycondensation reaction conditions.

10. The process of claim 9 wherein the step of reacting under polycondensation reaction conditions is carried out in a polycondensation pipe reactor.

11. A process comprising:
performing the process according to claim 8 to make a pre-polyester; and
reacting the pre-polyester and optionally other reactants, under polycondensation reaction conditions.

12. The process of claim 11 wherein the step of reacting under polycondensation reaction conditions is carried out in a polycondensation pipe reactor.

13. The process of claim 7 wherein the ratio of the mass flow rate of the solubilizing agent added to the pipe to the mass flow of the material leaving the pipe and not being recycled back to the pipe is from 2:1 to 25:1.

14. The process of claim 8 wherein the ratio of the mass flow rate of the solubilizing agent added to the pipe to the mass flow of the material leaving the pipe and not being recycled back to the pipe is from 2:1 to 25:1.

15. A process comprising:
performing the process according to claim 13 to make a pre-polyester; and
reacting the pre-polyester and optionally other reactants, under polycondensation reaction conditions.

16. A process comprising:
performing the process according to claim 14 to make a pre-polyester; and
reacting the pre-polyester and optionally other reactants, under polycondensation reaction conditions.

17. The process of claim 7 wherein the ratio of the mass flow rate of the solubilizing agent added to the RR zone to the mass flow of the material leaving the RR zone and not being recycled back to the RR zone is from 2:1 to 25:1.

18. The process of claim 8 wherein the ratio of the mass flow rate of the solubilizing agent added to the RR zone to the mass flow of the material leaving the RR zone and not being recycled back to the RR zone is from 2:1 to 25:1.

19. A process comprising:
performing the process according to claim 17 to make a pre-polyester; and
reacting the pre-polyester and optionally other reactants, under polycondensation reaction conditions.

20. A process comprising:
performing the process according to claim 18 to make a pre-polyester; and
reacting the pre-polyester and optionally other reactants, under polycondensation reaction conditions.

21. The process of claim 1 wherein the reactants forming the pre-polyester comprise a diacid, a diol, a diester, a hydroxy ester, an acid ester, a hydroxy acid or combinations thereof.

22. The process of claim 2 wherein the reactants forming the pre-polyester comprise a diacid, a diol, a diester, a hydroxy ester, an acid ester, a hydroxy acid or combinations thereof.

23. A process comprising:
performing the process according to claim 21 to make a pre-polyester; and
reacting the pre-polyester and optionally other reactants, under polycondensation reaction conditions.

24. The process of claim 23 wherein the step of reacting under polycondensation reaction conditions is carried out in a polycondensation pipe reactor.

25. A process comprising:
performing the process according to claim 22 to make a pre-polyester; and
reacting the pre-polyester and optionally other reactants, under polycondensation reaction conditions.

26. The process of claim 25 wherein the step of reacting under polycondensation reaction conditions is carried out in a polycondensation pipe reactor.

27. The process of claim 1 wherein the reactants forming the pre-polyester comprise terephthalic acid, dimethyl terephthalate, cyclohexane dimethanol, isophthalic acid, ethylene glycol or combinations thereof.

28. The process of claim 2 wherein the reactants forming the pre-polyester comprise terephthalic acid, dimethyl terephthalate, cyclohexane dimethanol, isophthalic acid, ethylene glycol or combinations thereof.

29. A process comprising:
performing the process according to claim 27 to make a pre-polyester; and
reacting the pre-polyester and optionally other reactants, under polycondensation reaction conditions.

30. The process of claim 29 wherein the step of reacting under polycondensation reaction conditions is carried out in a polycondensation pipe reactor.

31. A process comprising:
performing the process according to claim 28 to make a pre-polyester; and reacting the pre-polyester and optionally other reactants, under polycondensation reaction conditions.

32. The process of claim 31 wherein the step of reacting under polycondensation reaction conditions is carried out in a polycondensation pipe reactor.

33. The process of claim 3 wherein the polyester is polyethylene terephthalate or polyethylene terephthalate modified with cyclohexane dimethanaol.

34. The process of claim 5 wherein the polyester is polyethylene terephthalate or polyethylene terephthalate modified with cyclohexane dimethanaol.

35. The process of claim 1 wherein the average solids content of the material flowing through the outlet of the RR zone of the pipe is less than 2.5 weight percent.

36. The process of claim 2 wherein the average solids content of the material flowing through the outlet of the RR zone of the pipe is less than 2.5 weight percent.

37. A process comprising:
performing the process according to claim 35 to make a pre-polyester; and
reacting the pre-polyester and optionally other reactants, under polycondensation reaction conditions.

38. The process of claim 37 wherein the step of reacting under polycondensation reaction conditions is carried out in a polycondensation pipe reactor.

39. A process comprising:
performing the process according to claim 36 to make a pre-polyester; and
reacting the pre-polyester and optionally other reactants, under polycondensation reaction conditions.

40. The process of claim 39 wherein the step of reacting under polycondensation reaction conditions is carried out in a polycondensation pipe reactor.

41. The process of claim 1 wherein the conversion in the product of the RR zone of the pipe is 75 to 95 percent.

42. The process of claim 2 wherein the conversion in the product of the RR zone of the pipe is 75 to 95 percent.

43. A process comprising:
performing the process according to claim 41 to make a pre-polyester; and
reacting the pre-polyester and optionally other reactants, under polycondensation reaction conditions.

44. The process of claim 43 wherein the step of reacting under polycondensation reaction conditions is carried out in a polycondensation pipe reactor.

45. A process comprising:
performing the process according to claim 42 to make a pre-polyester; and
reacting the pre-polyester and optionally other reactants, under polycondensation reaction conditions.

46. The process of claim 45 wherein the step of reacting under polycondensation reaction conditions is carried out in a polycondensation pipe reactor.

47. The process of claim 27 wherein the conversion in the product of the RR zone of the pipe is 75 to 95 percent.

48. The process of claim 28 wherein the conversion in the product of the RR zone of the pipe is 75 to 95 percent.

49. A process comprising:
performing the process according to claim 47 to make a pre-polyester; and
reacting the pre-polyester and optionally other reactants, under polycondensation reaction conditions.

50. A process comprising:
performing the process according to claim 48 to make a pre-polyester; and
reacting the pre-polyester and optionally other reactants, under polycondensation reaction conditions.

51. The process of claim 35 wherein operating conditions in the pipe are such that conversion at the outlet of the PRPR zone is greater than or equal to 1.08 times the conversion at the outlet of the RR zone.

52. The process of claim 36 wherein operating conditions in the pipe are such that conversion at the outlet of the PRPR zone is greater than or equal to 1.08 times the conversion at the outlet of the RR zone.

53. A process comprising:
performing the process according to claim 51 to make a pre-polyester; and
reacting the pre-polyester and optionally other reactants, under polycondensation reaction conditions.

54. The process of claim 53 wherein the step of reacting under polycondensation reaction conditions is carried out in a polycondensation pipe reactor.

55. A process comprising:
performing the process according to claim 52 to make a pre-polyester; and
reacting the pre-polyester and optionally other reactants, under polycondensation reaction conditions.

56. The process of claim 55 wherein the step of reacting under polycondensation reaction conditions is carried out in a polycondensation pipe reactor.

57. The process of claim 17 wherein the reactants forming the pre-polyester comprise terephthalic acid, dimethyl terephthalate, cyclohexane dimethanol, isophthalic acid, ethylene glycol or combinations thereof.

58. The process of claim 18 wherein the reactants forming the pre-polyester comprise terephthalic acid, dimethyl terephthalate, cyclohexane dimethanol, isophthalic acid, ethylene glycol or combinations thereof.

59. A process comprising:
performing the process according to claim 57 to make a pre-polyester; and
reacting the pre-polyester and optionally other reactants, under polycondensation reaction conditions.

60. A process comprising:
performing the process according to claim 58 to make a pre-polyester; and
reacting the pre-polyester and optionally other reactants, under polycondensation reaction conditions.

61. The process of claim 57 wherein the average solids content of the material flowing through the outlet of the RR zone of the pipe is less than 2.5 weight percent.

62. The process of claim 58 wherein the average solids content of the material flowing through the outlet of the RR zone of the pipe is less than 2.5 weight percent.

63. A process comprising:
performing the process according to claim 61 to make a pre-polyester; and
reacting the pre-polyester and optionally other reactants, under polycondensation reaction conditions.

64. A process comprising:
performing the process according to claim 62 to make a pre-polyester; and
reacting the pre-polyester and optionally other reactants, under polycondensation reaction conditions.

65. The process of claim 57 wherein the conversion in the product of the RR zone of the pipe is 75 to 95 percent.

66. The process of claim 58 wherein the conversion in the product of the RR zone of the pipe is 75 to 95 percent.

67. A process comprising:
performing the process according to claim 65 to make a pre-polyester; and
reacting the pre-polyester and optionally other reactants, under polycondensation reaction conditions.

68. A process comprising:
performing the process according to claim 66 to make a pre-polyester; and
reacting the pre-polyester and optionally other reactants, under polycondensation reaction conditions.

69. The process of claim 61 wherein operating conditions in the pipe are such that conversion at the outlet of the PRPR zone is greater than or equal to 1.08 times the conversion at the outlet of the RR zone.

70. The process of claim 62 wherein operating conditions in the pipe are such that conversion at the outlet of the PRPR zone is greater than or equal to 1.08 times the conversion at the outlet of the RR zone.

71. A process comprising:
performing the process according to claim 69 to make a pre-polyester; and
reacting the pre-polyester and optionally other reactants, under polycondensation reaction conditions.

72. A process comprising:
performing the process according to claim 70 to make a pre-polyester; and
reacting the pre-polyester and optionally other reactants, under polycondensation reaction conditions.

73. The process of claim 70 wherein the conversion in the product of the RR zone of the pipe is 75 to 95 percent.

74. A process comprising:
performing the process according to claim 73 to make a pre-polyester; and
reacting the pre-polyester and optionally other reactants, under polycondensation reaction conditions.

75. The process of claim 74 wherein the step of reacting under polycondensation reaction conditions is carried out in a polycondensation pipe reactor.

76. The process of claim 1 further comprising removing vapor from inside the pipe.

77. The process of claim 2 further comprising removing vapor from inside the pipe.

78. The process of claim 1 further comprising removing vapor from inside the RR zone.

79. The process of claim 2 further comprising removing vapor from inside the RR zone.

80. The process of claim 1 wherein at least one of the RR and PRPR zones has froth or stratified flow appearing.

81. The process of claim 2 wherein at least one of the RR and PRPR zones has froth or stratified flow appearing.

82. The process of claim 1 wherein the solubilizing agent is added at least in part from a tank.

83. The process of claim 2 wherein the solubilizing agent is added at least in part from a tank.

84. The process of claim 1 wherein the solubilizing agent is at least in part from the outlet of the RR zone.

85. The process of claim 2 wherein the solubilizing agent is at least in part from the outlet of the RR zone.

86. The process of claim 1 wherein the solubilizing agent is at least in part a product of a polyester polycondensation reactor.

87. The process of claim 2 wherein the solubilizing agent is at least in part a product of a polyester polycondensation reactor.

88. An apparatus for making a pre-polyester comprising:
an esterification pipe reactor comprising a pipe,
the pipe having an inlet, an outlet and means for addition of a solubilizing agent, and wherein pre-polyester forming reactants are passed towards the outlet, with the pipe also having a recirculation reaction zone (RR zone) and a plug reaction profile reaction zone (PRPR zone) with the RR zone being closer to the inlet than the PRPR zone is.

89. The apparatus of claim 88 wherein the pipe is substantially empty.

90. An apparatus comprising:
the apparatus of claim 88; and
a polycondensation reactor connected to the outlet of the pipe.

91. The apparatus of claim 90 wherein the polycondensation reactor is a polycondensation pipe reactor.

92. An apparatus comprising:
the apparatus of claim 89; and
a polycondensation reactor connected to the outlet of the pipe.

93. The apparatus of claim 92 wherein the polycondensation reactor is a polycondensation pipe reactor.

94. The apparatus of claim 88 further comprising means for vapor removal along the pipe.

95. The apparatus of claim 89 further comprising means for vapor removal along the pipe.

96. An apparatus comprising:
the apparatus of claim 94; and
a polycondensation reactor connected to the outlet of the pipe.

97. An apparatus comprising:
the apparatus of claim 95; and
a polycondensation reactor connected to the outlet of the pipe.

98. The apparatus of claim 88 wherein the means for addition of a solubilizing agent is into the RR zone.

99. The apparatus of claim 89 wherein the means for addition of a solubilizing agent is into the RR zone.

100. An apparatus comprising:
the apparatus of claim 98; and
a polycondensation reactor connected to the outlet of the pipe.

101. An apparatus comprising:
the apparatus of claim 99; and
a polycondensation reactor connected to the outlet of the pipe.

102. The apparatus of claim 88 further comprising a solids detector connected to the outlet of the RR zone.

103. The apparatus of claim 89 further comprising a solids detector connected to the outlet of the RR zone.

104. An apparatus comprising:
the apparatus of claim 102; and
a polycondensation reactor connected to the outlet of the pipe.

105. An apparatus comprising:
the apparatus of claim 103; and
a polycondensation reactor connected to the outlet of the pipe.

106. The apparatus of claim 89 further comprising a solids detector connected to the outlet of the RR zone and means for vapor removal along the pipe and wherein the means for addition of a solubilizing is into the RR zone.

107. An apparatus comprising:
the apparatus of claim 106; and
a polycondensation reactor connected to the outlet of the pipe.

108. The apparatus of claim 107 wherein the polycondensation reactor is a polycondensation pipe reactor.

109. A process comprising:
(a) esterifying a reaction mixture flowing through a first pipe reactor zone to thereby form an esterification reaction product;
(b) separating said esterification reaction product into a recycle portion and a non-recycle portion at a separating location; and
(c) introducing at least a portion of said recycle portion into at least a portion of said reaction mixture at a location upstream of said separating location.

110. The process of claim 109, wherein said process further comprises transporting said recycle portion introduced into said reaction mixture through at least a portion of said first pipe reactor zone, 111. The process of claim 109, wherein said process further comprises subjecting said non-recycle portion of said esterification reaction product to further reaction.

112. The process of claim 111, wherein said further reaction comprises esterification and/or polycondensation.

113. The process of claim 111, wherein said further reaction comprises esterification in a second pipe reactor zone.

114. The process of claim 113, wherein the esterification in said second pipe reactor zone provides a greater conversion than the esterification said first pipe reactor zone.

115. The process of claim 114, wherein the conversion in said second pipe reactor zone is at least 1.08 times the conversion in the first pipe reactor zone.

116. The process of claim 113, wherein said first and second pipe reactor zones are defined by a single pipe reactor.

117. The process of claim 113, wherein said first pipe reactor zone is a recirculation reaction zone (RR zone) and said second pipe reactor zone is a plug reaction profile reaction zone (PRPR zone).

118. The process of claim 113, wherein said reaction mixture flows through at least a portion of said second pipe reactor zone in plug, stratified, and/or froth flow.

119. The process of claim 109, wherein the ratio of the mass flow rate of recycled portion to the non-recycled portion is in the range of from 2:1 to 25:1.

120. The process of claim 109, wherein said recycle portion contains less than 2.5 weight percent solids.

121. The process of claim 109, wherein said reaction mixture comprises a reactant in the form of solid particles.

122. The process of claim 121, wherein said recycle portion of said reaction product aids in the dissolution of said solid particles.

123. The process of claim 109, wherein said reaction mixture flows through at least a portion of said first pipe reactor zone in stratified and/or froth flow.

124. The process of claim 109, wherein said reaction mixture contains reactants selected from the group consisting of dicarboxylic acids, diols, diesters, hydroxyl esters, carboxylic acid esters, hydroxyl carboxylic acids, tricarboxylic acids, and combinations thereof.

125. The process of claim 109, wherein said reaction mixture contains terephthalic acid and ethylene glycol.

126. The process of claim 13, wherein the ratio of the mass flow rate of the solubilizing agent added to the pipe to the mass flow of the material leaving the pipe and not being recycled back to the pipe is from 3:1 to 20:1.

127. The process of claim 14, wherein the ratio of the mass flow rate of the solubilizing agent added to the pipe to the mass flow of the material leaving the pipe and not being recycled back to the pipe is from 3:1 to 20:1.

128. The process of claim 17, wherein the ratio of the mass flow rate of the solubilizing agent added to the RR zone to the mass flow of the material leaving the RR zone and not being recycled back to the RR zone is from 3:1 to 20:1.

129. The process of claim 18, wherein the ratio of the mass flow rate of the solubilizing agent added to the RR zone to the mass flow of the material leaving the RR zone and not being recycled back to the RR zone is from 3:1 to 20:1.

130. The process of claim 35, wherein the average solids content of the material flowing through the outlet of the RR zone of the pipe is less than 0.5 weight percent.

131. The process of claim 36, wherein the average solids content of the material flowing through the outlet of the RR zone of the pipe is less than 0.5 weight percent.

132. The process of claim 41, wherein the conversion in the product of the RR zone of the pipe is 80 to 95 percent.

133. The process of claim 132, wherein the conversion in the product of the RR zone of the pipe is 80 to 90 percent.

134. The process of claim 42, wherein the conversion in the product of the RR zone of the pipe is 80 to 95 percent.

135. The process of claim 134, wherein the conversion in the product of the RR zone of the pipe is 80 to 90 percent.

136. The process of claim 47, wherein the conversion in the product of the RR zone of the pipe is 80 to 95 percent.

137. The process of claim 136, wherein the conversion in the product of the RR zone of the pipe is 80 to 90 percent.

138. The process of claim 48, wherein the conversion in the product of the RR zone of the pipe is 80 to 95 percent.

139. The process of claim 138, wherein the conversion in the product of the RR zone of the pipe is 80 to 90 percent.

140. The process of claim 51, wherein operating conditions in the pipe are such that conversion at the outlet of the PRPR zone is greater than or equal to 1.10 times the conversion at the outlet of the RR zone.

141. The process of claim 140, wherein operating conditions in the pipe are such that conversion at the outlet of the PRPR zone is greater than or equal to 1.15 times the conversion at the outlet of the RR zone.

142. The process of claim 52, wherein operating conditions in the pipe are such that conversion at the outlet of the PRPR zone is greater than or equal to 1.10 times the conversion at the outlet of the RR zone.

143. The process of claim 142, wherein operating conditions in the pipe are such that conversion at the outlet of the PRPR zone is greater than or equal to 1.15 times the conversion at the outlet of the RR zone.

144. The process of claim 61, wherein the average solids content of the material flowing through the outlet of the RR zone of the pipe is less than 0.5 weight percent.

145. The process of claim 62, wherein the average solids content of the material flowing through the outlet of the RR zone of the pipe is less than 0.5 weight percent.

146. The process of claim 65, wherein the conversion in the product of the RR zone of the pipe is 80 to 95 percent.

147. The process of claim 146, wherein the conversion in the product of the RR zone of the pipe is 80 to 90 percent.

148. The process of claim 66, wherein the conversion in the product of the RR zone of the pipe is 80 to 95 percent.

149. The process of claim 148, wherein the conversion in the product of the RR zone of the pipe is 80 to 90 percent.

150. The process of claim 69, wherein operating conditions in the pipe are such that conversion at the outlet of the PRPR zone is greater than or equal to 1.10 times the conversion at the outlet of the RR zone.

151. The process of claim 150, wherein operating conditions in the pipe are such that conversion at the outlet of the PRPR zone is greater than or equal to 1.15 times the conversion at the outlet of the RR zone.

152. The process of claim 70, wherein operating conditions in the pipe are such that conversion at the outlet of the PRPR zone is greater than or equal to 1.10 times the conversion at the outlet of the RR zone.

153. The process of claim 152, wherein operating conditions in the pipe are such that conversion at the outlet of the PRPR zone is greater than or equal to 1.15 times the conversion at the outlet of the RR zone.

154. The process of claim 69, wherein the conversion in the product of the RR zone of the pipe is 75 to 95 percent.

155. The process of claim 154, wherein the conversion in the product of the RR zone of the pipe is 80 to 95 percent.

156. The process of claim 155, wherein the conversion in the product of the RR zone of the pipe is 80 to 90 percent.

157. The process of claim 73, wherein the conversion in the product of the RR zone of the pipe is 80 to 95 percent.

158. The process of claim 157, wherein the conversion in the product of the RR zone of the pipe is 80 to 90 percent.

159. A process comprising:
performing the process according to claim 154 to make a pre-polyester; and
reacting the pre-polyester and optionally other reactants, under polycondensation reaction conditions.

160. The process of claim 159, wherein the step of reacting under polycondensation reaction conditions is carried out in a polycondensation pipe reactor.

161. The apparatus of claim 88 further comprising a solids detector connected to the outlet of the RR zone and means for vapor removal along the pipe and wherein the means for addition of a solubilizing is into the RR zone.

162. An apparatus comprising:
the apparatus of claim 161; and
a polycondensation reactor connected to the outlet of the pipe.

163. The apparatus of claim 162, wherein the polycondensation reactor is a polycondensation pipe reactor.

164. The process of claim 109, wherein the conversion in the second pipe reactor zone at least 1.10 times the conversion in the first pipe reactor zone.

165. The process of claim 164, wherein the conversion in the second pipe reactor zone at least 1.15 times the conversion in the first pipe reactor zone.

166. The process of claim 119, wherein the ratio of the mass flow rate of recycled portion to the non-recylced portion is RR zone and not being recycled back to the RR zone is from 3:1 to 20:1.

167. The process of claim 35, wherein the average solids content of the material flowing through the outlet of the RR zone of the pipe is less than 0.5 weight percent.

* * * * *